(12) United States Patent
Kimura

(10) Patent No.: US 11,062,468 B2
(45) Date of Patent: Jul. 13, 2021

(54) DISTANCE MEASUREMENT USING PROJECTION PATTERNS OF VARYING DENSITIES

(71) Applicant: Magik Eye Inc., New York, NY (US)

(72) Inventor: Akiteru Kimura, Hachioji (JP)

(73) Assignee: MAGIK EYE INC., New York, NY (US)

( * ) Notice: Subject to any disclaimer, the term of this patent is extended or adjusted under 35 U.S.C. 154(b) by 0 days.

(21) Appl. No.: 16/354,360

(22) Filed: Mar. 15, 2019

(65) Prior Publication Data

US 2019/0295270 A1 Sep. 26, 2019

Related U.S. Application Data

(60) Provisional application No. 62/645,185, filed on Mar. 20, 2018.

(51) Int. Cl.
*G06T 7/521* (2017.01)
*G01C 3/08* (2006.01)
*G06T 7/246* (2017.01)

(52) U.S. Cl.
CPC ............... *G06T 7/521* (2017.01); *G01C 3/08* (2013.01); *G06T 7/246* (2017.01); *G06T 2207/10028* (2013.01); *G06T 2207/10048* (2013.01); *G06T 2207/30241* (2013.01)

(58) Field of Classification Search
CPC ...................... G06T 7/246; G06T 7/521; G06T 2207/10048; G06T 2207/30241; G01C 3/08
See application file for complete search history.

(56) References Cited

U.S. PATENT DOCUMENTS

| 4,914,460 A | 4/1990 | Caimi et al. |
| 5,699,444 A | 12/1997 | Palm |
| 5,730,702 A | 3/1998 | Tanaka et al. |
| 5,870,136 A | 2/1999 | Fuchs et al. |
| 5,980,454 A | 11/1999 | Broome |
| 6,038,415 A | 3/2000 | Nishi et al. |

(Continued)

FOREIGN PATENT DOCUMENTS

| CN | 101794065 A | 8/2010 |
| CN | 103196385 A | 7/2013 |

(Continued)

OTHER PUBLICATIONS

International Search Report and Written Opinion mailed in corresponding PCT/US2019/022412 dated Jul. 3, 2019, 10 pages.

*Primary Examiner* — Obafemi O Sosanya
(74) *Attorney, Agent, or Firm* — Tong, Rea, Bentley & Kim, LLC

(57) ABSTRACT

In one example, a method includes instructing a pattern projector of a distance sensor to project a pattern of light onto the object, wherein the pattern comprise a plurality of parallel rows of projection artifacts, and wherein a spatial density of the projection artifacts in a first row of the plurality of parallel rows is different from a spatial density of the projection artifacts in a second row of the plurality of parallel rows, instructing a camera of the distance sensor to acquire an image of the object, where the image includes the pattern of light, and calculating a distance from the distance sensor to the object based on an analysis of the image.

20 Claims, 8 Drawing Sheets

(56) References Cited

U.S. PATENT DOCUMENTS

| | | |
|---|---|---|
| 6,442,476 B1 | 8/2002 | Poropat |
| 6,668,082 B1 | 12/2003 | Davison et al. |
| 6,937,350 B2 | 8/2005 | Shirley |
| 7,191,056 B2 | 3/2007 | Costello et al. |
| 7,193,645 B1 | 3/2007 | Aagaard et al. |
| 7,375,803 B1 | 5/2008 | Bamji |
| 7,589,825 B2 | 9/2009 | Orchard et al. |
| 9,098,909 B2 | 8/2015 | Nomura |
| 9,488,757 B2 | 11/2016 | Mukawa |
| 9,686,539 B1 | 6/2017 | Zuliani et al. |
| 9,888,225 B2 | 2/2018 | Znamensky et al. |
| 9,986,208 B2 | 5/2018 | Chao et al. |
| 2003/0071891 A1 | 4/2003 | Geng |
| 2004/0167744 A1 | 8/2004 | Lin et al. |
| 2006/0044546 A1 | 3/2006 | Lewin et al. |
| 2006/0055942 A1 | 3/2006 | Krattiger |
| 2006/0290781 A1 | 12/2006 | Hama |
| 2007/0091174 A1 | 4/2007 | Kochi et al. |
| 2007/0165243 A1 | 7/2007 | Kang et al. |
| 2007/0206099 A1 | 9/2007 | Matsuo |
| 2010/0149315 A1 | 6/2010 | Qu et al. |
| 2010/0223706 A1 | 9/2010 | Becker et al. |
| 2010/0238416 A1 | 9/2010 | Kuwata |
| 2011/0188054 A1 | 8/2011 | Petronius et al. |
| 2012/0051588 A1 | 3/2012 | Mceldowney |
| 2012/0056982 A1 | 3/2012 | Katz et al. |
| 2012/0062758 A1 | 3/2012 | Devine et al. |
| 2012/0113252 A1 | 5/2012 | Yang et al. |
| 2012/0219699 A1 | 8/2012 | Pettersson |
| 2012/0225718 A1 | 9/2012 | Zhang |
| 2012/0236317 A1 | 9/2012 | Nomura |
| 2013/0088575 A1 | 4/2013 | Park et al. |
| 2013/0155417 A1 | 6/2013 | Ohsawa |
| 2013/0242090 A1 | 9/2013 | Yoshikawa |
| 2013/0307933 A1 | 11/2013 | Znamensky et al. |
| 2014/0000520 A1 | 1/2014 | Bareket |
| 2014/0009571 A1 | 1/2014 | Geng |
| 2014/0016113 A1 | 1/2014 | Holt et al. |
| 2014/0036096 A1 | 2/2014 | Sterngren |
| 2014/0071239 A1 | 3/2014 | Yokota |
| 2014/0085429 A1 | 3/2014 | Hérbert |
| 2014/0125813 A1 | 5/2014 | Holz |
| 2014/0207326 A1 | 7/2014 | Murphy |
| 2014/0241614 A1 | 8/2014 | Lee |
| 2014/0275986 A1 | 9/2014 | Vertikov |
| 2014/0320605 A1 | 10/2014 | Johnson |
| 2015/0009301 A1 | 1/2015 | Ribnick et al. |
| 2015/0012244 A1 | 1/2015 | Oki |
| 2015/0077764 A1 | 3/2015 | Braker et al. |
| 2015/0131054 A1* | 5/2015 | Wuellner ............. A61B 3/0025 351/211 |
| 2015/0016003 A1 | 6/2015 | Terry et al. |
| 2015/0171236 A1 | 6/2015 | Murray |
| 2015/0248796 A1 | 9/2015 | Iyer et al. |
| 2015/0268399 A1 | 9/2015 | Futterer |
| 2015/0288956 A1 | 10/2015 | Mallet et al. |
| 2015/0323321 A1 | 11/2015 | Oumi |
| 2015/0336013 A1 | 11/2015 | Stenzier et al. |
| 2015/0381907 A1 | 12/2015 | Boetliger et al. |
| 2016/0022374 A1 | 1/2016 | Haider |
| 2016/0117561 A1 | 4/2016 | Miyazawa et al. |
| 2016/0128553 A1 | 5/2016 | Geng |
| 2016/0157725 A1 | 6/2016 | Munoz |
| 2016/0178915 A1 | 6/2016 | Mor et al. |
| 2016/0249810 A1 | 9/2016 | Darty et al. |
| 2016/0261854 A1 | 9/2016 | Ryu et al. |
| 2016/0267682 A1 | 9/2016 | Yamashita |
| 2016/0288330 A1 | 10/2016 | Konolige |
| 2016/0327385 A1 | 11/2016 | Kimura |
| 2016/0328854 A1 | 11/2016 | Kimura |
| 2016/0334939 A1 | 11/2016 | Dawson et al. |
| 2016/0350594 A1 | 12/2016 | McDonald |
| 2017/0098305 A1 | 4/2017 | Gossow |
| 2017/0102461 A1 | 4/2017 | Tezuka et al. |
| 2017/0221226 A1 | 8/2017 | Shen et al. |
| 2017/0270689 A1 | 9/2017 | Messely et al. |
| 2017/0284799 A1 | 10/2017 | Wexler et al. |
| 2017/0307544 A1 | 10/2017 | Nagata |
| 2017/0347086 A1 | 11/2017 | Watanabe |
| 2018/0010903 A1* | 1/2018 | Takao ................. G01B 11/25 |
| 2018/0011194 A1 | 1/2018 | Masuda et al. |
| 2018/0073863 A1 | 3/2018 | Watanabe |
| 2018/0080761 A1 | 3/2018 | Takao et al. |
| 2018/0143018 A1 | 5/2018 | Kimura |
| 2018/0156609 A1 | 6/2018 | Kimura |
| 2018/0227566 A1 | 8/2018 | Price et al. |
| 2018/0249142 A1* | 8/2018 | Hicks ................. H04N 17/002 |
| 2018/0324405 A1 | 11/2018 | Thirion |
| 2018/0329038 A1 | 11/2018 | Lin et al. |
| 2018/0357871 A1 | 12/2018 | Siminoff |
| 2019/0107387 A1 | 4/2019 | Kimura |
| 2019/0108743 A1 | 4/2019 | Kimura |
| 2019/0122057 A1 | 4/2019 | Kimura |
| 2019/0297241 A1 | 9/2019 | Kimura |
| 2019/0377088 A1 | 12/2019 | Kimura |
| 2020/0003556 A1 | 1/2020 | Kimura |
| 2020/0051268 A1 | 2/2020 | Kimura |
| 2020/0182974 A1 | 6/2020 | Kimura |
| 2020/0236315 A1 | 7/2020 | Kimura |

FOREIGN PATENT DOCUMENTS

| | | |
|---|---|---|
| CN | 103559735 A | 2/2014 |
| CN | 104160243 A | 11/2014 |
| EP | 0358628 A2 | 3/1990 |
| JP | H4-51112 A | 2/1992 |
| JP | H9-61126 | 3/1997 |
| JP | 2006-313116 A | 11/2006 |
| JP | 2007-10346 A | 1/2007 |
| JP | 2007-187581 A | 7/2007 |
| JP | 2007-315864 A | 12/2007 |
| JP | 2010-091855 A | 4/2010 |
| JP | 2010-101683 A | 5/2010 |
| JP | 4485365 B2 | 6/2010 |
| JP | 2010-256182 A | 11/2010 |
| JP | 2012-047500 A | 3/2012 |
| JP | 2014-020978 A | 2/2014 |
| JP | 2014-511590 A | 5/2014 |
| JP | 2014-122789 A | 7/2014 |
| JP | 6038415 B1 | 12/2016 |
| JP | 6241793 B2 | 12/2017 |
| KR | 10-2013-0000356 A | 1/2013 |
| KR | 10-2013-0037152 A | 4/2013 |
| KR | 10-2015-0101749 A | 9/2015 |
| KR | 10-2016-0020323 | 2/2016 |
| KR | 10-2017-0005649 A | 1/2017 |
| KR | 10-2017-0094968 | 8/2017 |
| TW | I320480 B | 2/2010 |
| TW | I451129 B | 4/2012 |
| WO | WO 2012/081506 A1 | 6/2012 |
| WO | WO/2013/145164 A1 | 10/2013 |
| WO | WO 2014/106843 A2 | 7/2014 |
| WO | WO 2014/131064 | 8/2014 |
| WO | WO 2015/166915 A1 | 11/2015 |

* cited by examiner

DISTANCE MEASUREMENT USING PROJECTION PATTERNS OF VARYING DENSITIES

CROSS REFERENCE TO RELATED APPLICATIONS

This application claims the priority of U.S. Provisional Patent Application Ser. No. 62/645,185, filed Mar. 20, 2018, which is herein incorporated by reference in its entirety.

BACKGROUND

U.S. patent application Ser. Nos. 14/920,246, 15/149,323, and 15/149,429 describe various configurations of distance sensors. Such distance sensors may be useful in a variety of applications, including security, gaming, control of unmanned vehicles, and other applications.

The distance sensors described in these applications include projection systems (e.g., comprising lasers, diffractive optical elements, and/or other cooperating components) which project beams of light in a wavelength that is substantially invisible to the human eye (e.g., infrared) into a field of view. The beams of light spread out to create a pattern (of dots, dashes, or other artifacts) that can be detected by an appropriate light receiving system (e.g., lens, image capturing device, and/or other components). When the pattern is incident upon an object in the field of view, the distance from the sensor to the object can be calculated based on the appearance of the pattern (e.g., the positional relationships of the dots, dashes, or other artifacts) in one or more images of the field of view, which may be captured by the sensor's light receiving system. The shape and dimensions of the object can also be determined.

For instance, the appearance of the pattern may change with the distance to the object. As an example, if the pattern comprises a pattern of dots, the dots may appear closer to each other when the object is closer to the sensor, and may appear further away from each other when the object is further away from the sensor.

SUMMARY

In one example, a method includes instructing a pattern projector of a distance sensor to project a pattern of light onto the object, wherein the pattern comprise a plurality of parallel rows of projection artifacts, and wherein a spatial density of the projection artifacts in a first row of the plurality of parallel rows is different from a spatial density of the projection artifacts in a second row of the plurality of parallel rows, instructing a camera of the distance sensor to acquire an image of the object, where the image includes the pattern of light, and calculating a distance from the distance sensor to the object based on an analysis of the image.

In another example, a non-transitory machine-readable storage medium is encoded with instructions executable by a processor. When executed, the instructions cause the processor to perform operations including instructing a pattern projector of a distance sensor to project a pattern of light onto the object, wherein the pattern comprise a plurality of parallel rows of projection artifacts, and wherein a spatial density of the projection artifacts in a first row of the plurality of parallel rows is different from a spatial density of the projection artifacts in a second row of the plurality of parallel rows, instructing a camera of the distance sensor to acquire an image of the object, where the image includes the pattern of light, and calculating a distance from the distance sensor to the object based on an analysis of the image.

In another example, a distance sensor includes a pattern projector to project a pattern of light onto an object, wherein the pattern comprise a plurality of parallel rows of projection artifacts, and wherein a spatial density of the projection artifacts in a first row of the plurality of parallel rows is different from a spatial density of the projection artifacts in a second row of the plurality of parallel rows, a camera to acquire an image of the object, where the image includes the pattern of light, and a processing system to calculate a distance from the distance sensor to the object based on an analysis of the image.

DETAILED DESCRIPTION

The present disclosure broadly describes an apparatus, method, and non-transitory computer-readable medium for distance measurement using projection patterns of varying densities. As discussed above, distance sensors such as those described in U.S. patent application Ser. Nos. 14/920,246, 15/149,323, and 15/149,429 determine the distance to an object (and, potentially, the shape and dimensions of the object) by projecting beams of light that spread out to create a pattern (e.g., of dots, dashes, or other artifacts) in a field of view that includes the object. The beams of light may be projected from one or more laser light sources which emit light of a wavelength that is substantially invisible to the human eye, but which is visible to an appropriate detector (e.g., of the light receiving system). The three-dimensional distance to the object may then be calculated based on the appearance of the pattern to the detector.

If there are a large number of projection beams, then the movement of the trajectories of the individual projection artifacts may overlap, which makes it more difficult to identify individual projection artifacts and their movement. This, in turn, complicates the distance measurement, since the movement of the projection artifacts affects their appearance. This problem becomes exacerbated when the density of the pattern is particularly high (e.g., as might occur when the object whose distance is being measured is very close to the distance sensor; typically, the smaller the distance, the greater the pattern density). On the other hand, high-density patterns are typically desirable as they allow for higher resolution distance measurements to be made.

Examples of the present disclosure provide projection patterns whose densities vary over the pattern. For instance, the pattern may comprise a plurality of lines of dots, where the density (e.g., closeness of the dots) of a first line is relatively high and the density of an adjacent second line is relatively low (e.g., lower than the first line). The lower density line is less likely to exhibit overlap of dot trajectories, which makes it easier to identify the individual dots in the lower density line. Once the dots in the lower density line are identified, this knowledge can be used to identify and distinguish the trajectories of the dots in the higher density line, allowing for an accurate, high-resolution distance measurement to be made.

Figure 1:
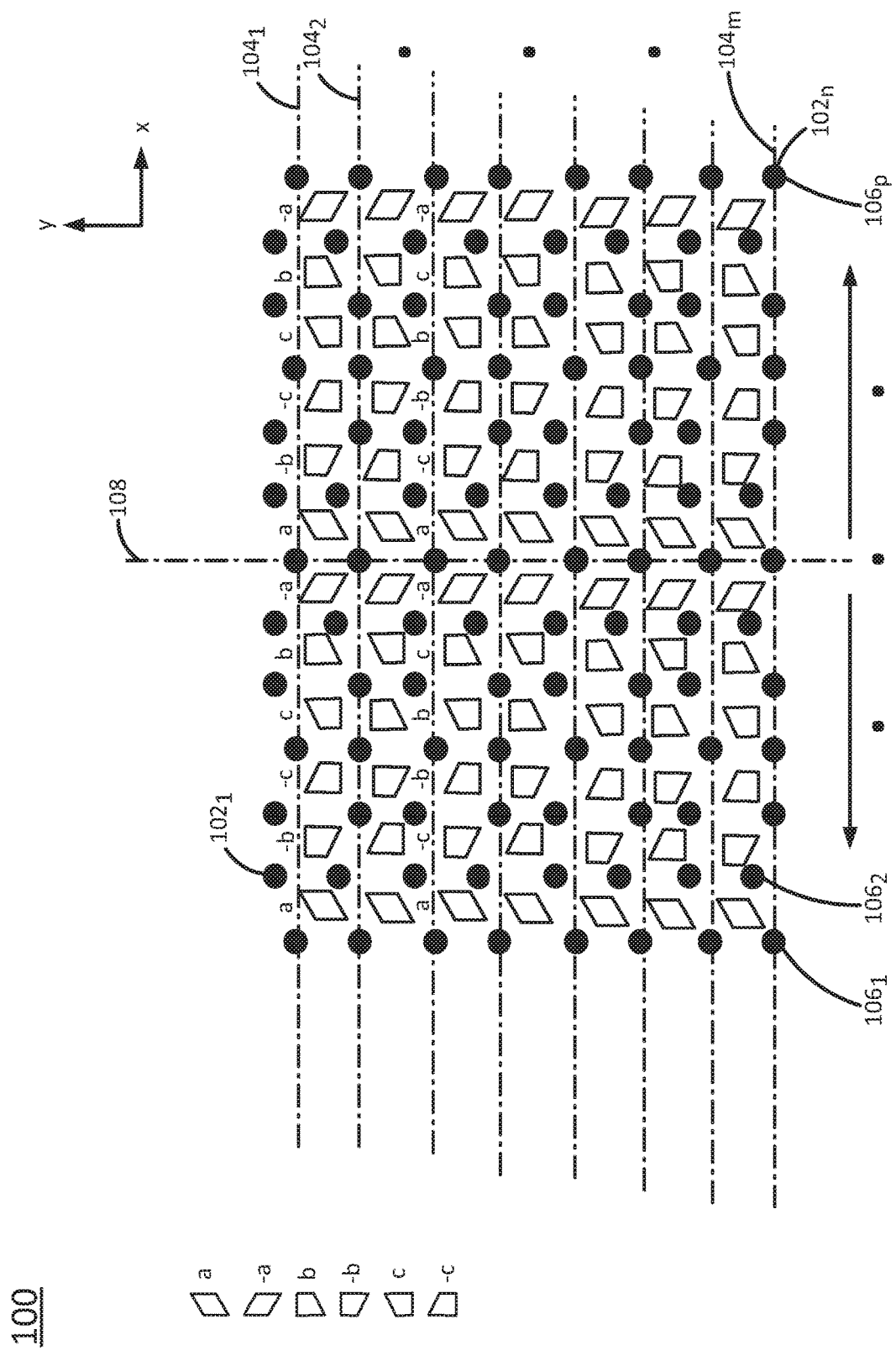
FIG. 1 illustrates an example projection pattern that may be projected by a light projection system of a distance sensor.

FIG. 1 illustrates an example projection pattern 100 that may be projected by a light projection system of a distance sensor, such as any of the distance sensors described in U.S. patent application Ser. Nos. 14/920,246, 15/149,323, and 15/149,429. As illustrated, the pattern comprises a plurality of dots $102_1$-$102_n$ (hereinafter individually referred to as a "dot 102" or collectively referred to as "dots 102") arranged to form a grid. The dots 102 may take other forms such as dashes, x's, or the like; thus, FIG. 1 employs dots for the sake of example. The dots 102 are arranged along the x and y axes of the grid, so that a plurality of rows $104_1$-$104_m$ (hereinafter individually referred to as "row 104" or collectively referred to as "rows 104") and a plurality of columns $106_1$-$106_p$ (hereinafter individually referred to as "column 106" or collectively referred to as "columns 106") are formed. This arrangement is symmetrical about a center line 108 that is parallel to the y axis (e.g., orthogonal to the rows). The trajectories of the dots 102 are parallel to (e.g., move along) the x axis.

In one example, any set of four adjacent dots 102 may be connected to form a quadrilateral. In one example, the quadrilateral may take one of six shapes: a, −a, b, −b, c, or −c, as shown by the legend in FIG. 1. In further examples, additional shapes may be possible. When all six quadrilaterals a, −a, b, −b, c, and −c are used in succession along the x axis without repeating, they constitute a "unit." In FIG. 1, each row 104 of the pattern 100 includes one unit on each side of the center line 108. A unit may comprise any order of the quadrilaterals a, −a, b, −b, c, and −c. In the example illustrated in FIG. 1, two different units are used in an alternating fashion. For instance, a first unit is used in row $104_1$, a different second unit is used in row $104_2$, and the units repeat in this way in an alternating fashion until tow $104_m$. Pu another way, the first and second units alternate along the y axis.

Figure 2:
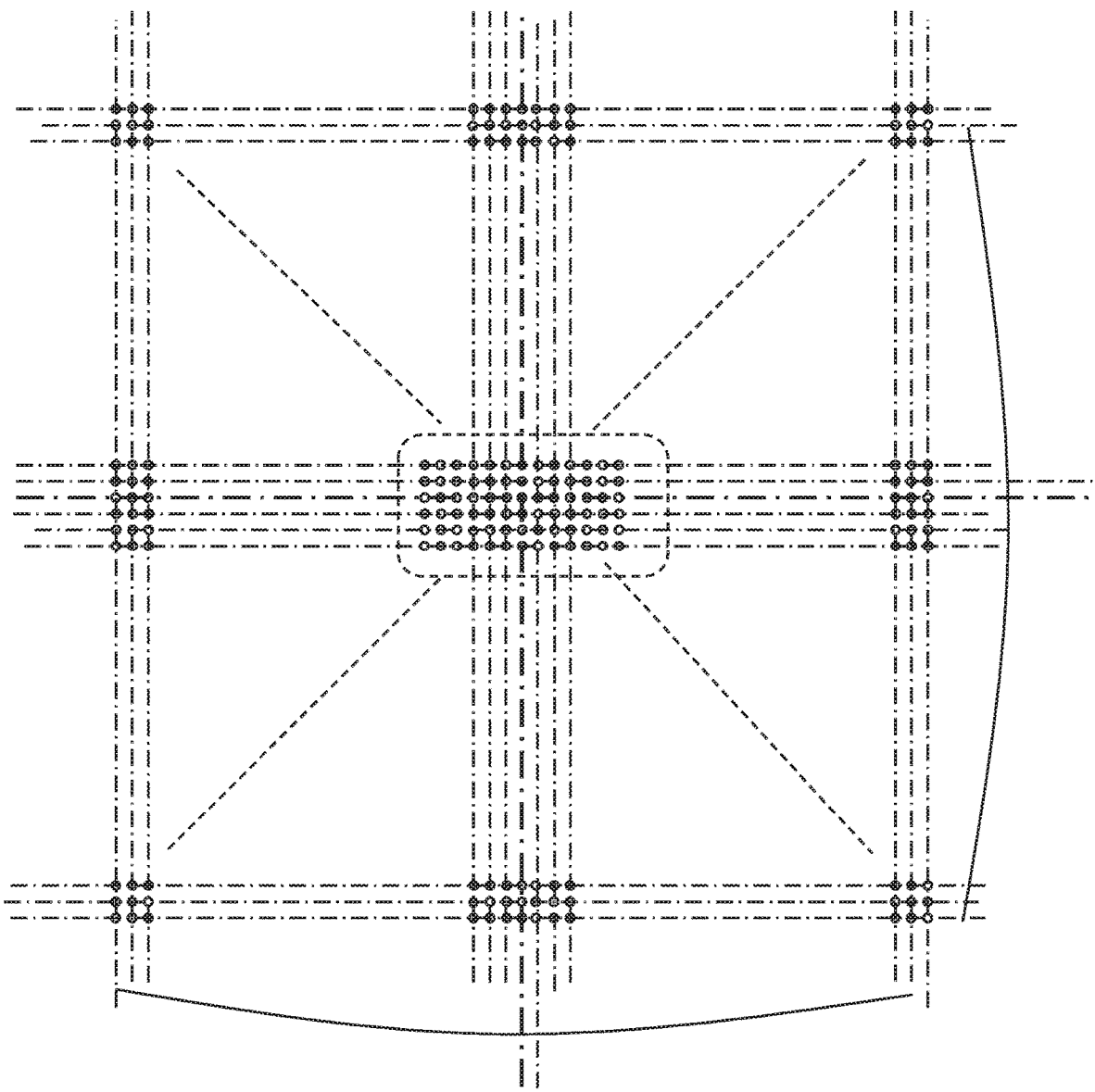
FIG. 2 illustrates the pattern of FIG. 1 enlarged to a high density pattern.

It should be noted that the quadrilaterals are illustrated in FIG. 1 only to show the relative positions or patterns of the dots 102, and do not comprise actual projection artifacts that are projected by the distance sensor. For instance, FIG. 2 illustrates the pattern 100 of FIG. 1 enlarged to a high density pattern.

Figure 3:
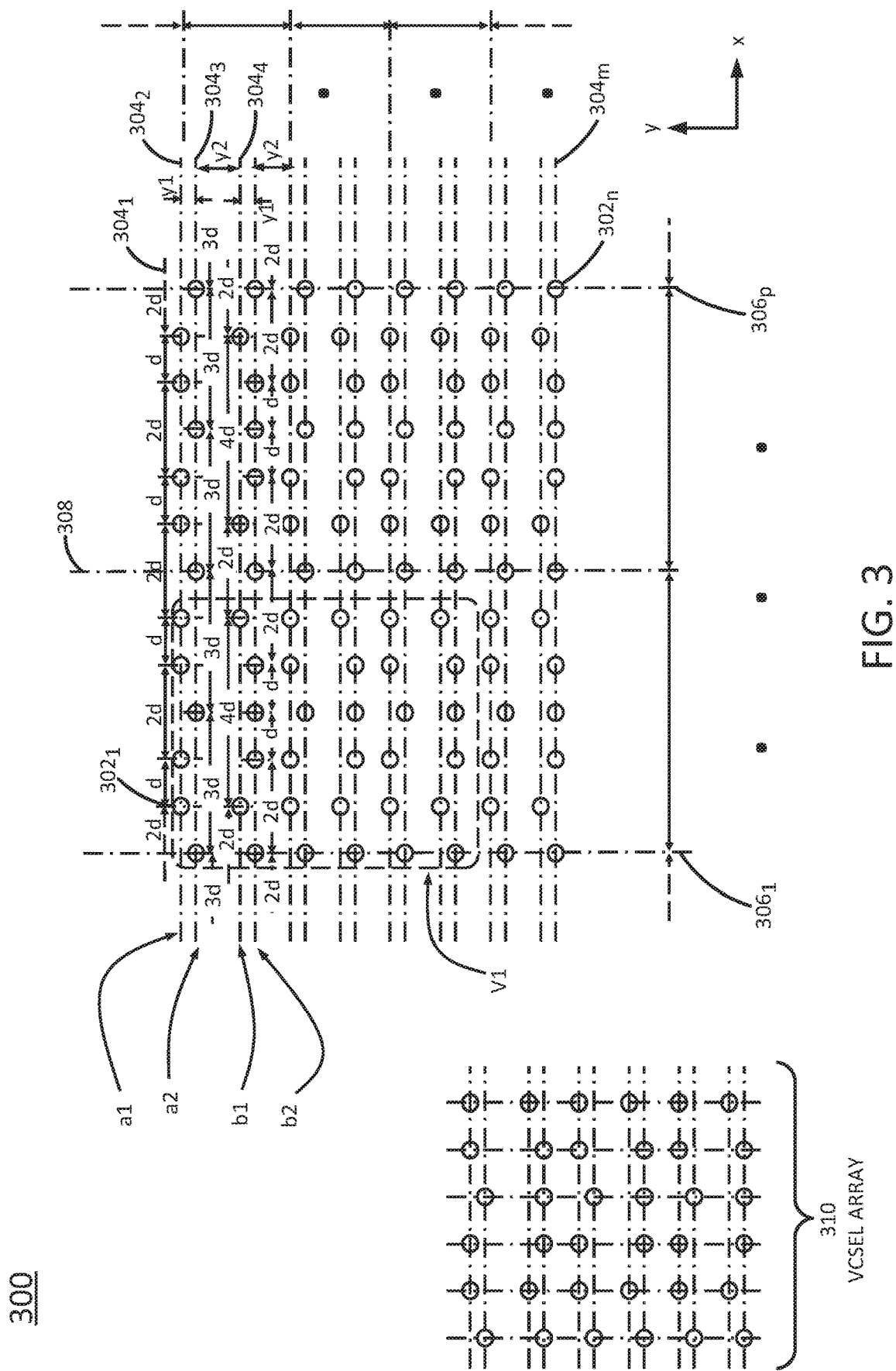
FIG. 3 illustrates another example projection pattern that may be projected by a light projection system of a distance sensor.

FIG. 3 illustrates another example projection pattern 300 that may be projected by a light projection system of a distance sensor, such as any of the distance sensors described in U.S. patent application Ser. Nos. 14/920,246, 15/149,323, and 15/149,429. As illustrated, the pattern comprises a plurality of dots $302_1$-$302_n$ (hereinafter individually referred to as a "dot 302" or collectively referred to as "dots 302") arranged to form a grid. The dots 302 may take other forms such as dashes, x's, or the like; thus, FIG. 3 employs dots for the sake of example. The dots 302 are arranged along the x and y axes of the grid, so that a plurality of rows $304_1$-$304_m$ (hereinafter individually referred to as "row 304" or collectively referred to as "rows 304") and a plurality of columns $306_1$-$306_p$ (hereinafter individually referred to as "column 306" or collectively referred to as "columns 306") are formed. This arrangement is symmetrical about a center line 308 that is parallel to the y axis. The trajectories of the dots 302 are parallel to (e.g., move along) the x axis.

Collectively, the plurality of rows 304 may be referred to as a "line set." A line set in this case comprises at least two rows, parallel to each other, where the at least two of the rows in the line set exhibit a different pattern density (distribution or spacing of dots 302). For instance, where the line set is limited to two rows, one row may have a high-density dot distribution and the other row may have a low-density dot distribution (relative to each other) In a further example, the spacing between the at least two rows (e.g., along the y axis) may be smaller than the spacing between other rows in the overall pattern (e.g., pattern 300).

In one example, the rows 304 may alternate between a relatively high-density pattern and a relatively low-density pattern. The relatively low-density pattern may exhibit larger spacing between dots 302 than the relatively high-density pattern. For instance, the dots 302 of row $304_1$ may be grouped into pairs, where the spacing between each dot 302 in a pair is d. The spacing between each pair in the row $304_1$, in turn, may be 2d. However, the spacing between the dots 302 of row $304_2$ may be 3d. Thus, the pattern of row $304_2$ is of low density relative to the pattern of row $304_1$.

The spacing between the dots 302 of row $304_3$ may be may alternate between 2d and 4d. Thus, the pattern of row $304_2$ is of low density relative to the pattern of row $304_2$. The dots 302 of row $304_4$ may be grouped sets of three, where the spacing between each dot 302 in a set is d. The spacing between each set in the row $304_4$, in turn, may be 2d. Thus, the pattern of row $304_4$ is of high density relative to the patterns of rows $304_1$, $304_2$, and $304_3$.

Thus the relative pattern density of each row 304 of the pattern 300 may vary. Any number of different densities may be used in the pattern 300. For instance, the pattern 300 could alternate between low-density and high-density row. Alternatively, a random arrangement of rows 304 of varying possible densities could be used.

In any case, all dots 302 that reside in a common row 304 are collinear. That is, all dots 302 that reside in a common row do not vary with respect to their position on the y axis. However, the spacing between rows along the y axis may be varied. For instance, as illustrated in FIG. 3, the spacing between rows $304_1$ and $304_2$, and between rows $304_3$ and $304_4$ is y1. However, the spacing between rows $304_2$ and $304_3$, and between rows $304_4$ and the next row 302 down the y axis, is y2.

Moreover, where there is an adjacent pair comprising a high-density row and a low-density row, the spacing between the high-density row and the low-density row may be smaller than the spacing between dots in either of the rows. For example, looking at the pair of high-density row $304_1$ and low-density row $304_2$ (also designated by the references a1 and a2, respectively), the spacing between row $304_1$ and row $304_2$, i.e., y1, is smaller than the spacings d, 2d, and 3d between the dots 302 in the rows $304_1$ and row $304_2$.

The pattern 300 may be projected by a vertical cavity surface emitting laser (VCSEL) array 310 in combination with one or more diffractive optical elements, e.g., as described in U.S. patent application Ser. Nos. 14/920,246, 15/149,323, and 15/149,429. In one example the arrangement of the holes on the VCSEL chip (e.g., the cavities that house the lasers) may be designed to produce the pattern 300. For instance, similar to the pattern 300, the arrangement of the holes may be designed as a series of rows, where the spacing between holes in each row may vary.

For instance, the VCSEL hole alignment of the VCSEL array 310 may be comprised of a "hole line set." In this case, a hole line set may comprise a at least two hole lines (or rows of holes), parallel to each other, which exhibit a different density (distribution or spacing) of holes. For instance, one hole line may exhibit a high density distribution of holes, while the other hole line exhibits a low density distribution of holes (relative to each other). In a further example, the spacing between the at least two hole lines (e.g., along the y axis) may be narrower than the spacing between the at least two hole lines and other hole lines of the VCSEL array.

Figure 4:
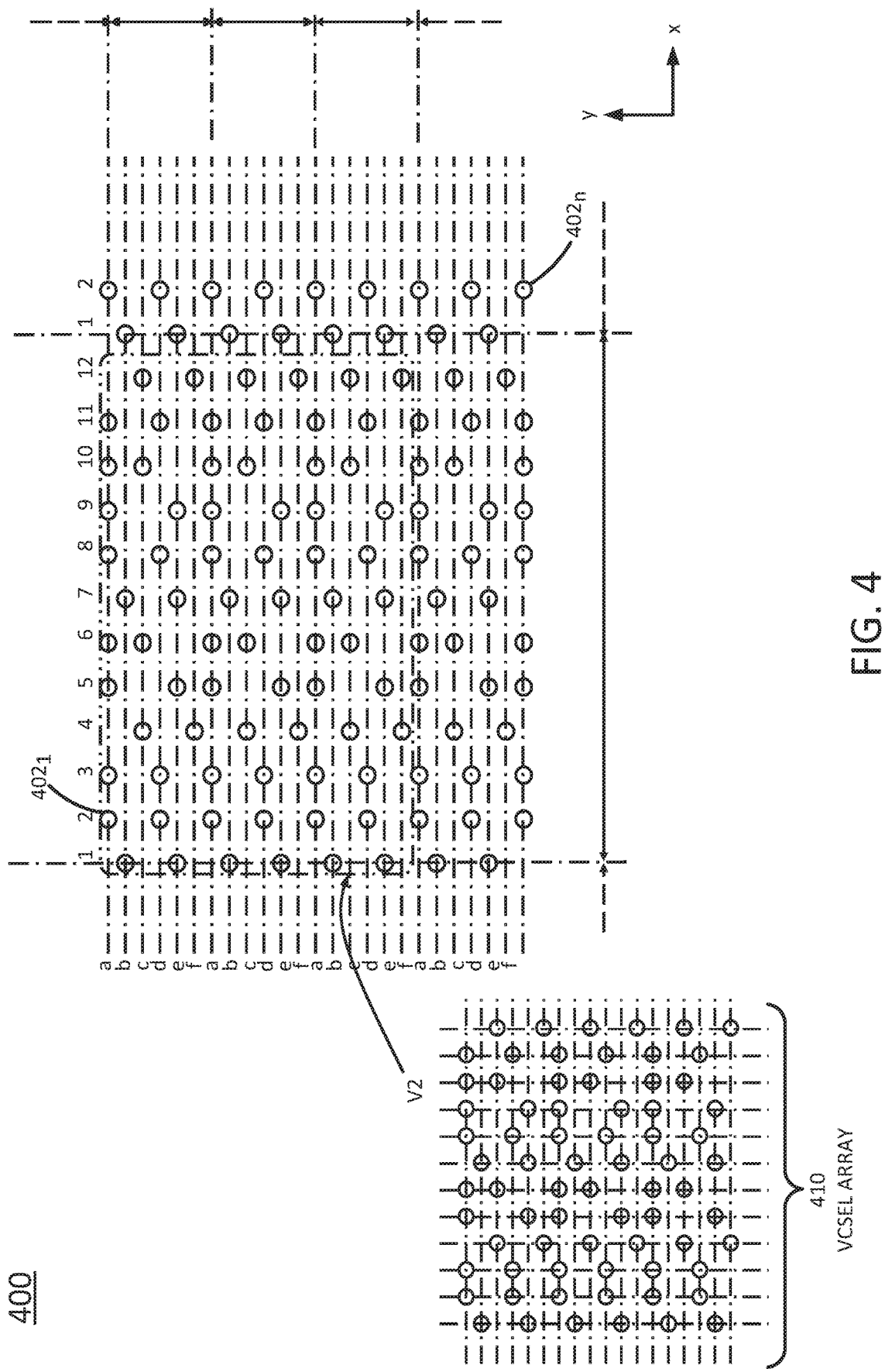
FIG. 4 illustrates another example projection pattern that may be projected by a light projection system of a distance sensor.

FIG. 4 illustrates another example projection pattern 400 that may be projected by a light projection system of a distance sensor, such as any of the distance sensors described in U.S. patent application Ser. Nos. 14/920,246, 15/149,323, and 15/149,429. As illustrated, the pattern comprises a plurality of dots $402_1$-$402_n$ (hereinafter individually referred to as a "dot 402" or collectively referred to as "dots 402") arranged to form a grid. The dots 402 may take other forms such as dashes, x's, or the like; thus, FIG. 4 employs dots for the sake of example. The dots 402 are arranged along the x and y axes of the grid, so that a plurality of rows a-f and a plurality of columns 1-12 are formed. The trajectories of the dots 402 are parallel to (e.g., move along) the x axis.

Collectively, the plurality of rows a-f may be referred to as a "line set." A line set in this case comprises a plurality of rows, all parallel to each other, where at least two of the rows in the line set exhibit a different pattern density (distribution or spacing of dots 402). In a further example, the spacing between the rows (e.g., along the y axis) is also the same for all rows in the line set.

In the example of FIG. 4, each of the rows a, b, c, d, e, and f may exhibit a different pattern density in terms of the spacing between the dots 402, as illustrated. For instance, the pattern density may be greatest in row a, smallest in row f, and fall somewhere in between the smallest and greatest densities in rows b, c, d, and e. Moreover, the pattern of rows, i.e., the ordering a, b, c, d, e, f, may repeat a number of times along the y axis. In the example illustrated in FIG. 4, the pattern of rows repeats four times. That is, there are four groupings of rows a-f.

The pattern 400 may be projected by a vertical cavity surface emitting laser (VCSEL) array 410 in combination with one or more diffractive optical elements, e.g., as described in U.S. patent application Ser. Nos. 14/920,246, 15/149,323, and 15/149,429. In one example the arrangement of the holes on the VCSEL chip (e.g., the cavities that house the lasers) may be designed to produce the pattern 400. For instance, similar to the pattern 400, the arrangement of the holes may be designed as a series of rows, where the spacing between holes in each row may vary.

For instance, the VCSEL hole alignment of the VCSEL array 410 may be comprised of a plurality of "hole line sets." In this case, a hole line set may comprise a plurality of hole lines (or rows of holes), all parallel to each other, where at least two lines in the hole line set exhibit a different density (distribution or spacing) of holes. In a further example, the spacing between the hole lines (e.g., along the y axis) may be the same for all hole lines.

Figure 5:
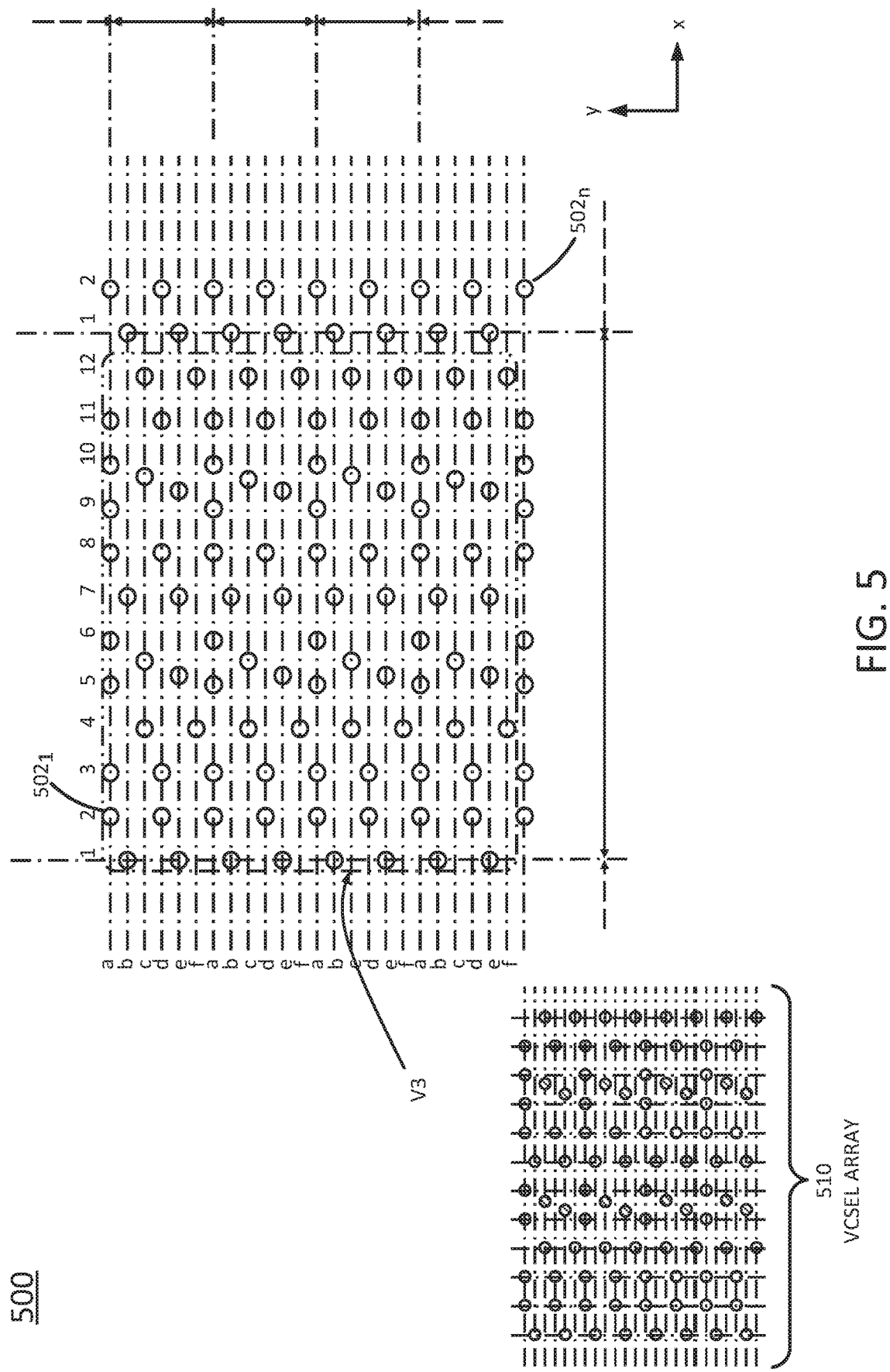
FIG. 5 illustrates another example projection pattern that may be projected by a light projection system of a distance sensor.

FIG. 5 illustrates another example projection pattern 500 that may be projected by a light projection system of a distance sensor, such as any of the distance sensors described in U.S. patent application Ser. Nos. 14/920,246, 15/149,323, and 15/149,429. As illustrated, the pattern comprises a plurality of dots $502_1$-$502_n$ (hereinafter individually referred to as a "dot 502" or collectively referred to as "dots 502") arranged to form a grid. The dots 502 may take other forms such as dashes, x's, or the like; thus, FIG. 5 employs dots for the sake of example. As in FIG. 4, the dots 502 are arranged along the x and y axes of the grid, so that a plurality of rows a-f and a plurality of columns 1-12 are formed. The trajectories of the dots 502 are parallel to (e.g., move along) the x axis.

As in FIG. 4, each of the rows a, b, c, d, e, and f may exhibit a different pattern density in terms of the spacing between the dots 502, as illustrated. For instance, the pattern density may be greatest in row a, smallest in row f, and fall somewhere in between the smallest and greatest densities in rows b, c, d, and e. Moreover, the pattern of rows, i.e., the ordering a, b, c, d, e, f, may repeat a number of times along the y axis. In the example illustrated in FIG. 5, the pattern of rows repeats four times. That is, there are four groupings of rows a-f.

The pattern 500 may be projected by a vertical cavity surface emitting laser (VCSEL) array 510 in combination with one or more diffractive optical elements, e.g., as described in U.S. patent application Ser. Nos. 14/920,246, 15/149,323, and 15/149,429. In one example the arrangement of the holes on the VCSEL chip (e.g., the cavities that house the lasers) may be designed to produce the pattern 500. For instance, similar to the pattern 500, the arrangement of the holes may be designed as a series of rows, where the spacing between holes in each row may vary.

Figure 6:
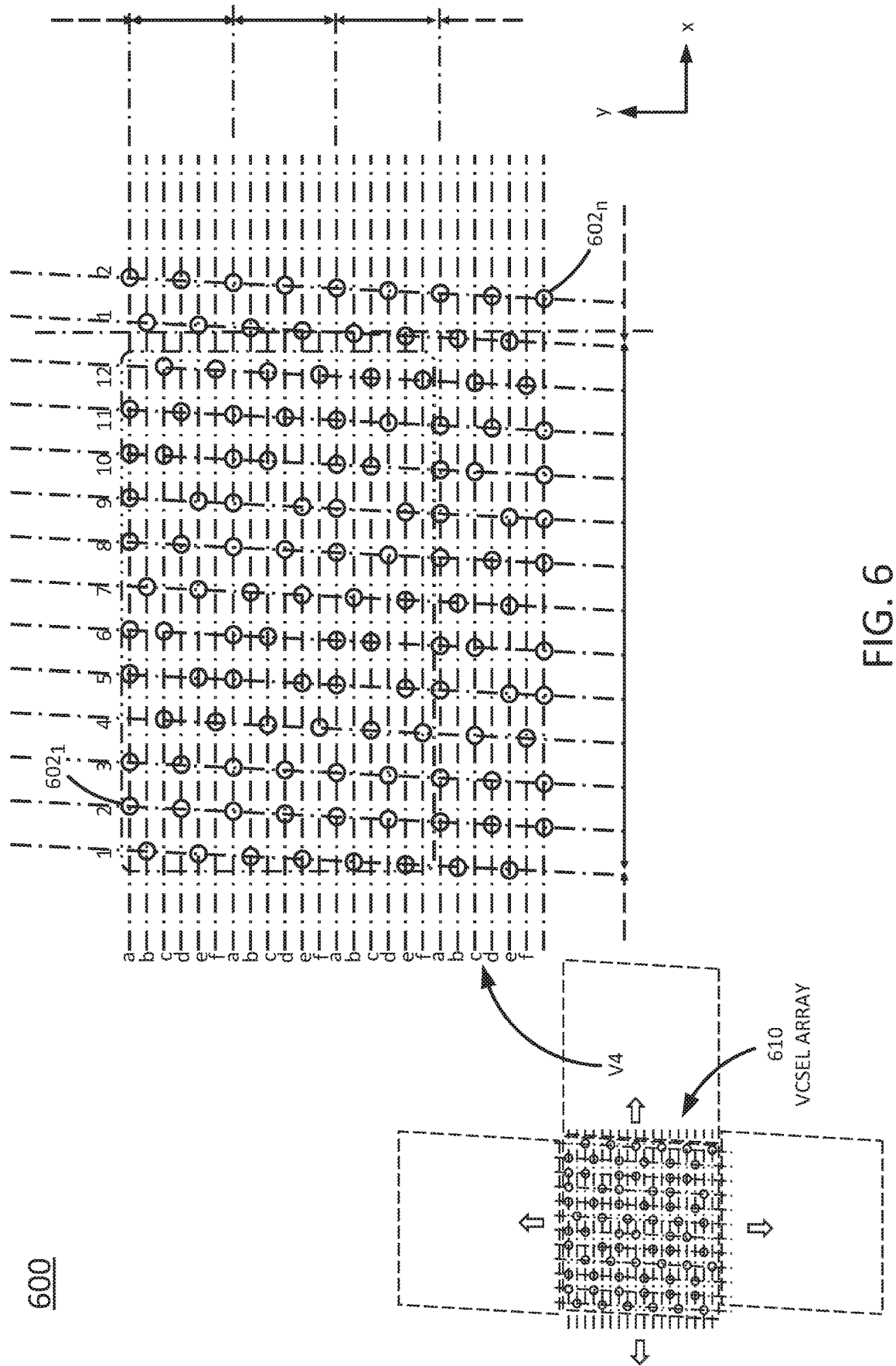
FIG. 6 illustrates another example projection pattern that may be projected by a light projection system of a distance sensor.

FIG. 6 illustrates another example projection pattern 600 that may be projected by a light projection system of a distance sensor, such as any of the distance sensors described in U.S. patent application Ser. Nos. 14/920,246, 15/149,323, and 15/149,429. As illustrated, the pattern comprises a plurality of dots $602_1$-$602_n$ (hereinafter individually referred to as a "dot 602" or collectively referred to as "dots 602") arranged to form a grid. The dots 602 may take other forms such as dashes, x's, or the like; thus, FIG. 6 employs dots for the sake of example. As in FIGS. 4 and 5, the dots 602 are arranged along the x and y axes of the grid, so that a plurality of rows a-f and a plurality of columns 1-12 are formed. The trajectories of the dots 602 are parallel to (e.g., move along) the x axis.

As in FIGS. 4-5, each of the rows a, b, c, d, e, and f may exhibit a different pattern density in terms of the spacing between the dots 602, as illustrated. For instance, the pattern density may be greatest in row a, smallest in row f, and fall somewhere in between the smallest and greatest densities in rows b, c, d, and e. Moreover, the pattern of rows, i.e., the ordering a, b, c, d, e, f, may repeat a number of times along the y axis. In the example illustrated in FIG. 6, the pattern of rows repeats four times. That is, there are four groupings of rows a-f.

The pattern 600 may be projected by a vertical cavity surface emitting laser (VCSEL) array 610 in combination with one or more diffractive optical elements, e.g., as described in U.S. patent application Ser. Nos. 14/920,246, 15/149,323, and 15/149,429. In one example the arrangement of the holes on the VCSEL chip (e.g., the cavities that house the lasers) may be designed to produce the pattern 600. For instance, similar to the pattern 600, the arrangement of the holes may be designed as a series of rows, where the spacing between holes in each row may vary.

Figure 7:
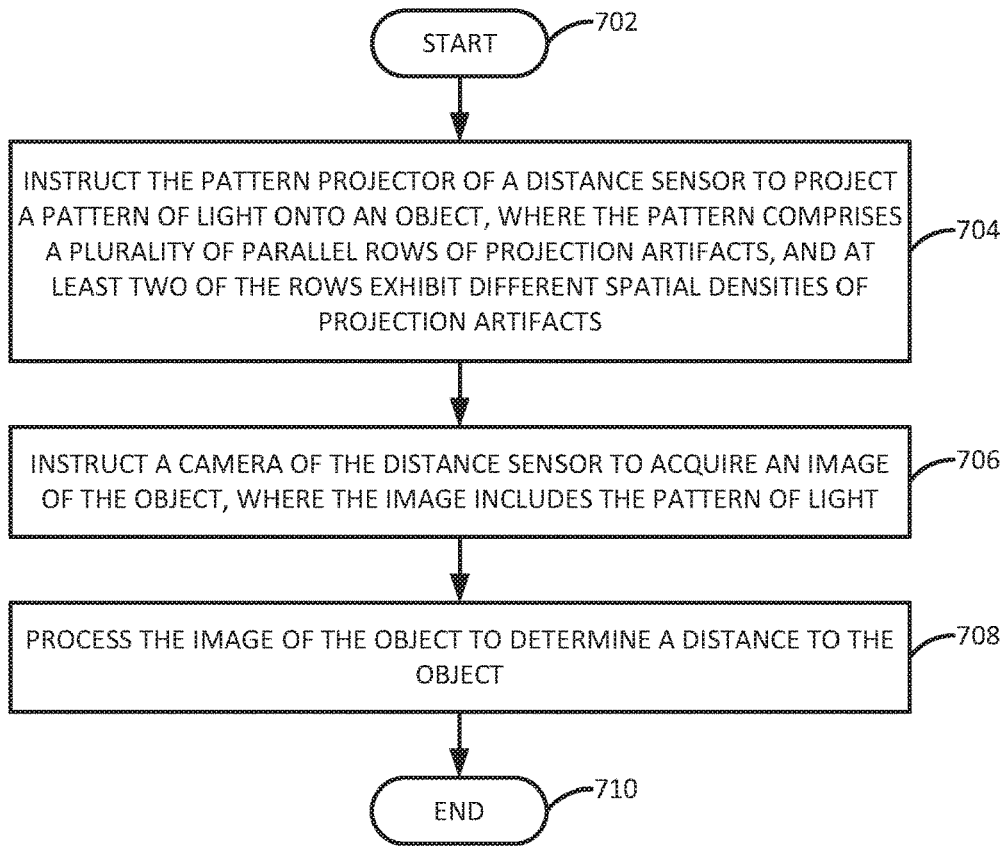
FIG. 7 is a flow diagram illustrating one example of a method for distance measurement using projection patterns of varying densities, according to the present disclosure.

FIG. 7 is a flow diagram illustrating one example of a method 700 for distance measurement using projection patterns of varying densities, according to the present disclosure. The method 700 may be performed, for example, by a processor, such as the processor of a distance sensor or the processor 802 illustrated in FIG. 8. For the sake of example, the method 700 is described as being performed by a processing system.

The method 700 may begin in step 702. In step 704, the processing system may instruct a projection system of the distance sensor (e.g., a set of optics including laser light sources, diffractive optical elements, lenses, and or other components) to project a pattern of light into an object in the field of view of a distance sensor's camera. In one example, the pattern of light may comprise light that is emitted in a wavelength that is substantially invisible to the human eye (e.g., infrared). The pattern may comprise a plurality of parallel rows of dots, dashes, x's, or other projection artifacts. The pattern densities of the individual rows may vary. In other words, at least two of the rows exhibit different spatial densities of projection artifacts. For instance, some of the rows may have a higher pattern density (e.g., closer spacing of projection artifacts) relative to others of the rows.

In step 706, the processing system may instruct a camera of the distance sensor to acquire an image of the object, where the image includes the pattern of light. In one example, the camera may comprise an infrared detector and a fish eye lens.

In step 708, the processing system may process the image in order to determine the distance to the object. For instance, any of the methods described in in U.S. patent application Ser. Nos. 14/920,246, 15/149,323, and 15/149,429 may be used to calculate the distance. In one example, the distance to the object may be determined based in part on the trajectories of the projection artifacts in the pattern. In a further example, the trajectory of a projection artifact in a low-density row of the pattern may be used to determine movement of the sensor relative to the object. Knowing the movement may, in turn, allow the trajectory of a projection artifact in a high-density row of the pattern to be identified. Knowing the trajectory of the artifacts in the high-density rows, may, in turn, allow high-resolution distance information to be determined. Alternatively, the processing system may send the first and second images to a remote processing system for the distance calculation.

The method 700 may end in step 710.

It should be noted that although not explicitly specified, some of the blocks, functions, or operations of the method 700 described above may include storing, displaying and/or outputting for a particular application. In other words, any data, records, fields, and/or intermediate results discussed in the method 700 can be stored, displayed, and/or outputted to another device depending on the particular application. Furthermore, blocks, functions, or operations in FIG. 7 that recite a determining operation, or involve a decision, do not imply that both branches of the determining operation are practiced. In other words, one of the branches of the determining operation may not be performed, depending on the results of the determining operation.

Figure 8:
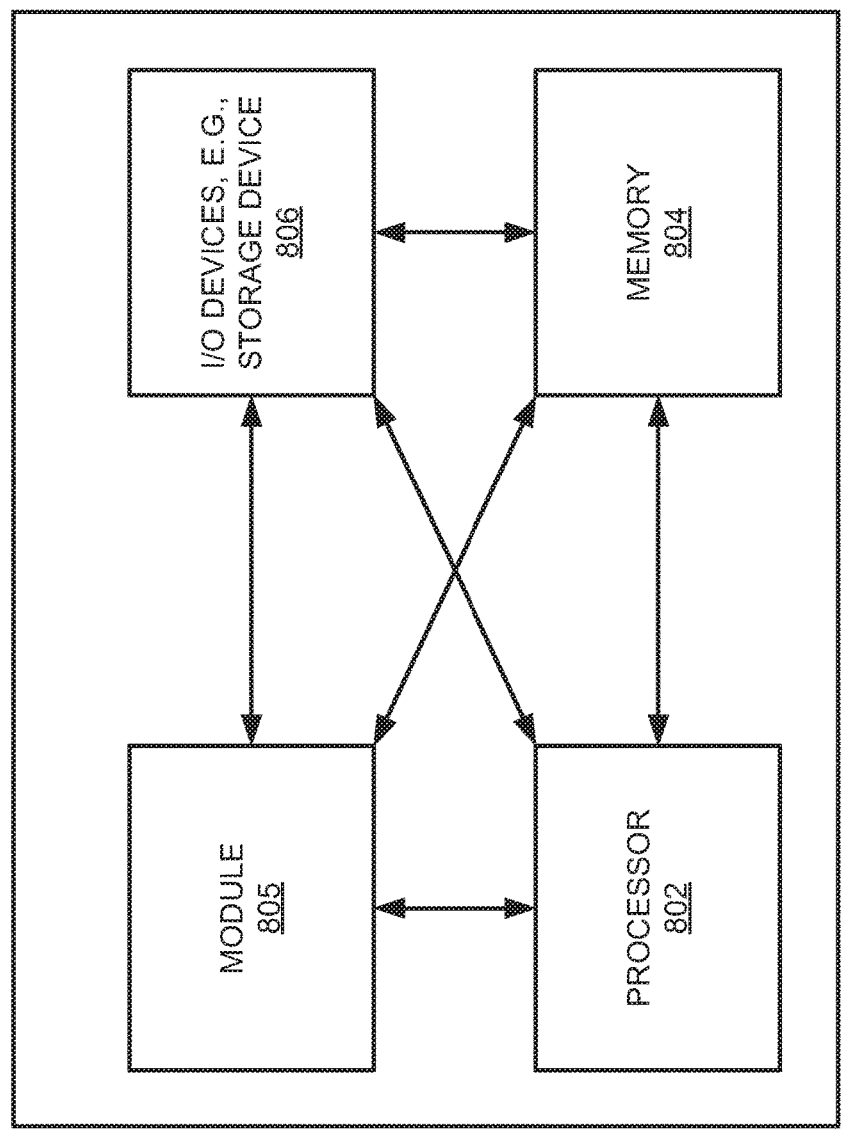
FIG. 8 depicts a high-level block diagram of an example electronic device for calculating the distance from a sensor to an object.

FIG. 8 depicts a high-level block diagram of an example electronic device 800 for calculating the distance from a sensor to an object. As such, the electronic device 800 may be implemented as a processor of an electronic device or system, such as a distance sensor.

As depicted in FIG. 8, the electronic device 800 comprises a hardware processor element 802, e.g., a central processing unit (CPU), a microprocessor, or a multi-core processor, a memory 804, e.g., random access memory (RAM) and/or read only memory (ROM), a module 805 for calculating the distance from a sensor to an object, and various input/output devices 806, e.g., storage devices, including but not limited to, a tape drive, a floppy drive, a hard disk drive or a compact disk drive, a receiver, a transmitter, a display, an output port, an input port, and a user input device, such as a keyboard, a keypad, a mouse, a microphone, a camera, a laser light source, an LED light source, and the like.

Although one processor element is shown, it should be noted that the electronic device 800 may employ a plurality of processor elements. Furthermore, although one electronic device 800 is shown in the figure, if the method(s) as discussed above is implemented in a distributed or parallel manner for a particular illustrative example, i.e., the blocks of the above method(s) or the entire method(s) are implemented across multiple or parallel electronic devices, then the electronic device 800 of this figure is intended to represent each of those multiple electronic devices.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the blocks, functions and/or operations of the above disclosed method(s).

In one example, instructions and data for the present module or process 805 for calculating the distance from a sensor to an object, e.g., machine readable instructions can be loaded into memory 804 and executed by hardware processor element 802 to implement the blocks, functions or operations as discussed above in connection with the method 700. Furthermore, when a hardware processor executes instructions to perform "operations", this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 805 for calculating the distance from a sensor to an object of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or an electronic device such as a computer or a controller of a safety sensor system.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. A method, comprising:
   instructing, by a processing system of a distance sensor, a pattern projector of the distance sensor to project a pattern of light onto the object, wherein the pattern comprises a plurality of parallel rows of projection artifacts, and wherein a spatial density of the projection artifacts in a first row of the plurality of parallel rows is controlled by the pattern projector to be different from a spatial density of the projection artifacts in a second row of the plurality of parallel rows;
   instructing, by the processing system, a camera of the distance sensor to acquire an image of the object, where the image includes the pattern of light; and
   calculating, by the processing system, a distance from the distance sensor to the object based on an analysis of the image.

2. The method of claim 1, wherein the spatial density of the projection artifacts in the first row comprises a spacing between the projection artifacts in the first row, and the spatial density of the projection artifacts in the second row comprises a spacing between the projection artifacts in the second row.

3. The method of claim 2, wherein the spacing between the projection artifacts in the first row is greater than the spacing between the projection artifacts in the second row.

4. The method of claim 2, wherein there is a variation in the spacing between the projection artifacts in the first row over a length of the first row.

5. The method of claim 4, wherein the variation comprises a repeated pattern.

6. The method of claim 1, wherein the calculating comprises:
   identifying, by the processing system, a first trajectory of one of the projection artifacts in the first row, wherein the spatial density of the projection artifacts in the first row is smaller than the spatial density of the projection artifacts in the second row;
   identifying, by the processing system, a movement of the distance sensor relative to the object, based on the first trajectory;
   identifying, by the processor, a second trajectory of one of the projection artifacts in the second row, based on the movement; and
   calculating the distance based on the second trajectory.

7. The method of claim 6, wherein the first trajectory and the second trajectory are parallel to the plurality of parallel rows.

8. The method of claim 1, wherein the projection artifacts in the first row are collinear with each other, and the projection artifacts in the second row are collinear with each other.

9. The method of claim 8, wherein spacings between rows of the plurality of parallel rows vary over a length of the pattern.

10. The method of claim 1, wherein the pattern is symmetrical about a center line that is orthogonal to the plurality of parallel rows.

11. The method of claim 1, wherein the pattern of light comprises light of a wavelength that is invisible to a human eye.

12. The method of claim 11, wherein the wavelength is infrared.

13. A non-transitory machine-readable storage medium encoded with instructions executable by a processor of a distance sensor, wherein, when executed, the instructions cause the processor to perform operations, the operations comprising:
   instructing a pattern projector of the distance sensor to project a pattern of light onto the object, wherein the pattern comprises a plurality of parallel rows of projection artifacts, and wherein a spatial density of the projection artifacts in a first row of the plurality of parallel rows is controlled by the pattern projector to be different from a spatial density of the projection artifacts in a second row of the plurality of parallel rows;
   instructing a camera of the distance sensor to acquire an image of the object, where the image includes the pattern of light; and
   calculating a distance from the distance sensor to the object based on an analysis of the image.

14. A distance sensor, comprising:
   a pattern projector to project a pattern of light onto an object, wherein the pattern comprises a plurality of parallel rows of projection artifacts, and wherein a spatial density of the projection artifacts in a first row of the plurality of parallel rows is controlled by the pattern projector to be different from a spatial density of the projection artifacts in a second row of the plurality of parallel rows;
   a camera to acquire an image of the object, where the image includes the pattern of light; and
   a processing system to calculate a distance from the distance sensor to the object based on an analysis of the image.

15. The distance sensor of claim 14, wherein the pattern projector comprises a vertical cavity surface emitting laser configured to emit light that forms the pattern.

16. The distance sensor of claim 14, wherein the spatial density of the projection artifacts in the first row comprises a spacing between the projection artifacts in the first row, and the spatial density of the projection artifacts in the second row comprises a spacing between the projection artifacts in the second row.

17. The distance sensor of claim 14, wherein there is a variation in the spacing between the projection artifacts in the first row over a length of the first row.

18. The distance sensor of claim 17, wherein the variation comprises a repeated pattern.

19. The distance sensor of claim 14, wherein spacings between rows of the plurality of parallel rows vary over a length of the pattern.

20. The distance sensor of claim 14, wherein the pattern of light comprises light of a wavelength that is invisible to a human eye.

* * * * *